US012404921B2

United States Patent
Palaskar et al.

(10) Patent No.: US 12,404,921 B2
(45) Date of Patent: Sep. 2, 2025

(54) SYSTEMS AND DEVICES FOR CONTROLLING SENSING PLATE LASH IN A LOCK DETECTION MECHANISM FOR ELECTRONIC LOCKING DIFFERENTIALS

(71) Applicant: Eaton Intelligent Power Limited, Dublin (IE)

(72) Inventors: Ram Palaskar, Pune (IN); Prajwal More, Pune (IN); Piyush Dube, Nagpur (IN); Andrew N. Edler, Homer, MI (US)

(73) Assignee: Eaton Intelligent Power Limited, Dublin (IE)

( * ) Notice: Subject to any disclaimer, the term of this patent is extended or adjusted under 35 U.S.C. 154(b) by 0 days.

(21) Appl. No.: 18/727,444

(22) PCT Filed: Jan. 10, 2023

(86) PCT No.: PCT/EP2023/025003
§ 371 (c)(1),
(2) Date: Jul. 9, 2024

(87) PCT Pub. No.: WO2023/131580
PCT Pub. Date: Jul. 13, 2023

(65) Prior Publication Data
US 2025/0075784 A1    Mar. 6, 2025

(30) Foreign Application Priority Data
Jan. 10, 2022    (IN) .............................. 202211001214

(51) Int. Cl.
*F16H 48/34*    (2012.01)
*F16H 48/38*    (2012.01)

(52) U.S. Cl.
CPC ............. *F16H 48/34* (2013.01); *F16H 48/38* (2013.01)

(58) Field of Classification Search
CPC .... F16H 48/34; F16H 48/24; F16H 2048/343; F16H 48/20–2048/346
See application file for complete search history.

(56) References Cited

U.S. PATENT DOCUMENTS 6,966,863 B2 *  11/2005  Teraoka ................. H02K 7/108
                                                 475/154
7,264,568 B2 *   9/2007  Ludwig ................. F16H 48/295
                                                 475/233

(Continued)

FOREIGN PATENT DOCUMENTS

CN      210003771        1/2020
EP      1 908 621 A1     4/2008

(Continued)

OTHER PUBLICATIONS

International Search Report and Written Opinion for Application No. PCT/EP2023/025003 mailed Mar. 24, 2023.

*Primary Examiner* — Sherry L Estremsky
(74) *Attorney, Agent, or Firm* — Merchant & Gould P.C.

(57) ABSTRACT

The present disclosure relates to an electronic locking differential gear mechanism having a lock detection mechanism for sensing and indication of a locked and unlocked state of the locking mechanism. The electronic locking differential gear mechanism includes an electronic stator which, when activated, rotates a ramped collar about an axis of the mechanism. The ramps of the ramped collar axially displace a plurality of push rods, which displace a locking collar and cause it to engage with a locker gear, placing the mechanism in a locked state. A sensor assembly detects the displacement of a sensing plate which is displaced along with the push rods, and thereby senses whether the mechanism is in a locked or unlocked state. Anti-rotation lugs (Continued)

interact with a tab of the sensor assembly to prevent rotation of the sensing plate relative to other components.

21 Claims, 16 Drawing Sheets

(56) References Cited

U.S. PATENT DOCUMENTS

| | | | |
|---|---|---|---|
| 7,572,202 B2* | 8/2009 | Donofrio | F16H 48/24 475/233 |
| 7,862,462 B2 | 1/2011 | Fusegi | |
| 9,556,945 B2* | 1/2017 | Fox | F16H 48/22 |
| 9,625,026 B2 | 4/2017 | Cochren et al. | |
| 9,657,827 B2 | 5/2017 | Gopal et al. | |
| 9,933,060 B2 | 4/2018 | Cochren et al. | |
| 9,989,140 B2* | 6/2018 | Onitake | F16H 48/24 |
| 10,036,658 B2* | 7/2018 | Hernandez-Oliver | G01D 11/245 |
| 10,215,268 B2* | 2/2019 | Creech | G01D 5/147 |
| 10,920,866 B2 | 2/2021 | Gostin, Jr. et al. | |
| 11,326,679 B2 | 5/2022 | Borgaonkar et al. | |
| 11,396,935 B2 | 7/2022 | Allen | |
| 11,867,270 B2* | 1/2024 | Welling | F16H 48/40 |
| 2007/0197338 A1 | 8/2007 | Fusegi | |
| 2015/0133254 A1 | 5/2015 | Fox | |
| 2019/0226566 A1 | 7/2019 | Hillman et al. | |
| 2019/0383378 A1 | 12/2019 | Surve et al. | |
| 2020/0116245 A1 | 4/2020 | Fritz et al. | |
| 2021/0131542 A1 | 5/2021 | Allen | |
| 2024/0426372 A1* | 12/2024 | Palaskar | F16H 48/34 |

FOREIGN PATENT DOCUMENTS

| | | |
|---|---|---|
| JP | 2004208460 | 7/2004 |
| WO | 2007/069042 A2 | 6/2007 |
| WO | 2013/176866 | 11/2013 |
| WO | 2014/116802 A1 | 7/2014 |
| WO | 2015/060890 | 4/2015 |
| WO | 2015/060890 A1 | 4/2015 |
| WO | 2017/100550 | 6/2017 |
| WO | 2018/057437 | 3/2018 |
| WO | 2018/232262 A1 | 12/2018 |
| WO | 2019/238272 | 12/2019 |
| WO | 2020/094252 | 5/2020 |
| WO | 2020/144090 | 7/2020 |

* cited by examiner

SYSTEMS AND DEVICES FOR CONTROLLING SENSING PLATE LASH IN A LOCK DETECTION MECHANISM FOR ELECTRONIC LOCKING DIFFERENTIALS

CROSS REFERENCE TO RELATED APPLICATION

This application is a National Stage Application of PCT/EP2023/025003, filed on Jan. 10, 2023, which claims priority to India Application No. 202211001214, titled SYSTEMS AND DEVICES FOR CONTROLLING SENSING PLATE LASH IN A LOCK DETECTION MECHANISM FOR ELECTRONIC LOCKING DIFFERENTIALS, filed on Jan. 10, 2022, the disclosure of which is hereby incorporated by reference in their entireties. To the extent appropriate, a claim of priority is made to each of the above disclosed applications.

BACKGROUND OF THE INVENTION

Vehicle drivetrains may include differential mechanisms which include gear sets that allow torque to be applied differently to wheels of the same axle during operation of the vehicle. In some instances, it may be desired to include a locking mechanism in the differential so that all torque is delivered equally to both wheels of the axle. Locking differentials, including electronic locking differentials, are generally known in the art. For locking differentials, it may be desirable to have a detection structure on such mechanisms to determine the locking state of the differential and provide the locking state to the operator of a vehicle.

SUMMARY

In some aspects, a locking mechanism is included in the differential mechanism so that all available torque is delivered equally to both wheels of the axle, locking both wheels in synchronous rotation with each other. A detection structure on such a locking mechanism to determine the locking state of the differential and provide the locking state to the operator of a vehicle may provide useful benefits to the driver, including ensuring that the locking mechanism is functioning properly, and monitoring vehicle performance and status for safe vehicle operations.

Accordingly, the present application describes, in an example aspect, a differential assembly comprising a first housing; a first half-axle output; a second half-axle output; a power input location; a gear set; an electrically activated locking assembly; and a sensor assembly. In an aspect, the gear set is disposed within the first housing and operably connects the first half-axle output, the second half-axle output, and the power input location together. In an aspect, the electrically activated locking assembly includes a second housing mounted to the first housing and is operable between a locked position, in which the first and second axle outputs are prevented from rotating relative to each other, and an unlocked position, in which the first and second half-axle outputs are enabled to rotate relative to each other. In an aspect, the sensor assembly includes a position sensing plate and a position sensor, the position sensing plate being coupled to the locking assembly such that operation of the locking assembly between the locked and unlocked positions causes axial movement of the position sensing plate and such that the position sensing plate is non-rotatable with respect to the second housing, and the position sensor is configured to measure an axial position of the position sensing plate.

In an aspect, the locking assembly includes a stator mounted within the second housing, a rotatable ramped collar actuated by the stator, a plurality of push rods axially displaceable by rotation of the ramped collar, and a locking collar axially displaceable by movement of the plurality of push rods, where in the locked position, the locking collar is engaged with a locker gear of the gear set, and where in the unlocked position, the locking collar is disengaged with the locker gear.

In an aspect, the ramped collar is located axially between the stator and the position sensing plate.

In an aspect, the position sensing plate is secured to the plurality of push rods.

In an aspect, one or more of the plurality of push rods includes a groove for receiving an edge portion of the position sensing plate. In an aspect, the edge portion defines a central aperture of the position sensing plate.

In an aspect, the position sensing plate is secured to the plurality of push rods with one or more fasteners. In an aspect, the one or more fasteners are snap rings.

In an aspect, the position sensing plate includes an axially extending tab and the position sensor is configured to sense movement of the axially extending tab.

In an aspect, the sensor assembly includes a sensor target mounted to the axially extending tab.

In an aspect, the position sensor is a magnetic-type position sensor that is spaced from the position sensing plate.

In an example aspect, a lock detection mechanism for a differential assembly comprises a locking element of the differential assembly; one or more push rods displaceable along an axis of the differential assembly, connected at a first end to a locking collar of the locking element and in contact at a second end with a ramped collar; a position sensing plate axially displaceable along the axis, wherein the position sensing plate is displaceable by the one or more push rods; and a sensor assembly to detect a status of the locking element, wherein the sensor assembly detects a displacement of the position sensing plate. In an aspect, the locking element is operable between a locked state and an unlocked state. In an aspect, the ramped collar is rotatable about the axis. In an aspect, the ramped collar comprises one or more ramp valleys and one or more ramp peaks. In an aspect, the one or more push rods are displaceable by the one or more ramp valleys and one or more ramp peaks.

In an aspect, the lock detection mechanism further comprises a sensor of the sensor assembly; and a tab of the sensor assembly. In an aspect, the tab is connected to the position sensing plate at a first end. In an aspect, the tab is displaceable by the position sensing plate along the axis. In an aspect, the tab is connected to a sensor target at a second end. In an aspect, a position of the sensor target is detectable by the sensor.

In an aspect, the sensor is a magnetic-type position sensor that is spaced from the position sensing plate.

In an aspect, the position sensing plate comprises a notch, and at least a portion of the tab fits within the notch.

In an aspect, the position sensing plate comprises one or more recessed portions, and each of the one or more recessed portions receives a portion of one of the one or more push rods.

In an aspect, each of the one or more push rods includes a groove receiving the respective recessed portion of the position sensing plate and at least one snap-ring on at least one side of the position sensing plate.

In an aspect, the ramped collar is rotatable by an electronic actuator mechanism.

An example method of detecting a locked state of a differential assembly, comprises rotating, about an axis of a differential assembly, a ramped collar ramp plate; displacing a push rod along the axis (the push rod in contact with the ramped collar at a first end) by the rotation of the ramped collar; displacing a locking collar of a locking element along the axis by the displacement of the push rod, where the locking collar is connected to the push rod at a second end; displacing a position sensing plate along the axis, by the displacement of the push rod; and sensing, by a sensor assembly, an axial displacement of the position sensing plate.

In an aspect, the method further comprises displacing a tab along the axis, by the displacement of the position sensing plate, where the tab is connected at a first end to the position sensing plate; detecting a position of a second end of the tab by a sensor of the sensor assembly; and indicating a status of the locking element.

In an example aspect, a lock detection arrangement for a differential assembly comprises: a sensor assembly including a position sensing plate and a position sensor, the position sensing plate being configured for connection to a locking element of the differential assembly and axially displaceable with reference to the position sensor between a locked state of the locking element and an unlocked state of the locking element; and a pair of anti-rotation lugs between which a first tab structure of the position sensing plate extends, the pair of anti-rotation lugs preventing rotation of the position sensing plate.

In an aspect, the pair of anti-rotation lugs are parallel with each other.

In an aspect, the side surfaces of the first tab structure are parallel to the pair of anti-rotation lugs when the sensing plate is centered between the pair of anti-rotation lugs.

In an aspect, each of the pair of anti-rotation lugs has a cylindrical shape.

In an aspect, the lock detection arrangement further comprises: a second pair of anti-rotation lugs opposite the first pair of anti-rotation lugs; and a second tab structure opposite the first tab structure and extending between the second pair of anti-rotation lugs.

In an example aspect, a differential assembly comprises: a differential including a gear set disposed within a housing and operably coupling a power input location to a first half-axle output and a second half-axle output; an electrically activated locking assembly operable between a locked position, in which the first and second axle half-axle outputs are prevented from rotating relative to each other, and an unlocked position, in which the first and second half-axle outputs are enabled to rotate relative to each other; a sensor assembly including a position sensing plate and a position sensor, the position sensing plate being operably coupled to the locking assembly and axially displaceable with reference to the position sensor between the locked and unlocked positions of the locking assembly; and a pair of anti-rotation lugs between which a first tab structure of the position sensing plate extends, the pair of anti-rotation lugs preventing rotation of the position sensing plate.

In an aspect, the pair of anti-rotation lugs are parallel with each other.

In an aspect, the side surfaces of the first tab structure are parallel to the pair of anti-rotation lugs when the first tab structure is centered between the pair of anti-rotation lugs.

In an aspect, each of the pair of anti-rotation lugs has a cylindrical shape.

In an aspect, the differential assembly further comprises: a second pair or anti-rotation lugs opposite the first pair of anti-rotation lugs; and a second tab structure opposite the first tab structure and extending between the second pair of anti-rotation lugs.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

Non-limiting and non-exhaustive examples are described with reference to the following Figures.

DETAILED DESCRIPTION

In the following detailed description, references are made to the accompanying drawings that form a part hereof, and in which are shown, by way of illustrations, specific embodiments, or examples. These aspects may be combined, other aspects may be utilized, and structural changes may be made without departing from the present disclosure. Examples may be practiced as methods, systems, or devices. The following detailed description is therefore not to be taken in a limiting sense, and the scope of the present disclosure is defined by the appended claims and their equivalents.

Vehicle drivetrains may include differential mechanisms which include gear sets 50 that allow torque to be applied differently to wheels of the same axle during operation of the vehicle. In some aspects, a driveshaft transferring torque from an engine or motor may, via a drive pinion gear, transfer torque to a ring gear of a transmission (for example, mounted to a flange of the transmission) by engagement with the ring gear. This ring gear is in a meshing engagement with a plurality of inner pinion gears (or spider gears) 52. In an aspect, the inner pinion gears 52 are in a meshing engagement with two side gears 54, 56, each side gear additionally having internal splines 58, 60 corresponding to a half-axle output. In an aspect, the ring gear is located outside of a case or housing, and the gear set (which operably connects the half-axle outputs and the power input location (driveshaft) together), including the inner pinion gears 52 and side gears 54, 56, are located within the case/housing.

In some aspects, a locking mechanism is included in the differential mechanism so that all available torque is delivered equally to both wheels of the axle, locking both wheels in synchronous rotation with each other. In some aspects, the locking mechanism is moved between a locked state and an unlocked state by an electrical action. In some aspects, the electrical action includes an electric stator. In some aspects, a driver or other user of a vehicle may trigger the electrical locking mechanism by way of a button, switch, or similar interactive device.

Figure 12:
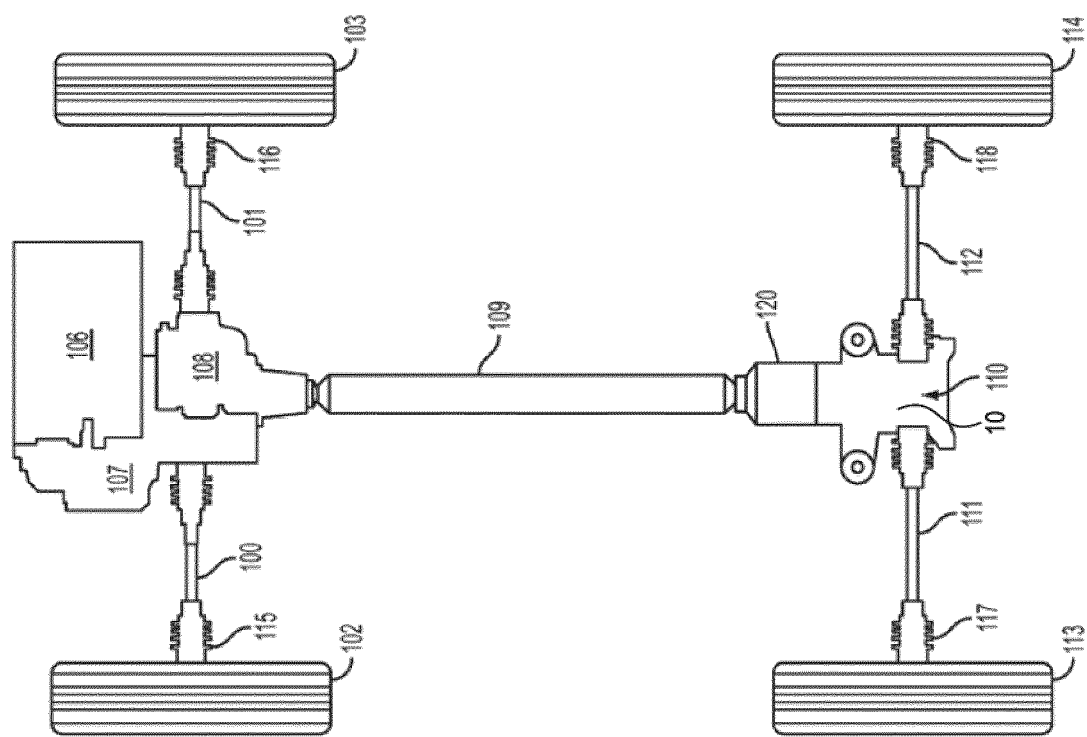
FIG. 12 illustrates a schematic view of a vehicle within which the electronic locking differential gear mechanism may be used.

Referring to FIG. 12, an example vehicle driveline is shown in accordance with the above description and disclosure and within which the disclosed electronic locking differential gear assembly 10 may be used. As shown, the vehicle driveline is provided with a power plant 106, such as an internal combustion engine or electric motor, a transmission 107, a power transfer unit 108 that are operatively connected at the front of the vehicle to transmit torque directly to a front left axle 100, and front right axle 101 such that wheels 102 and 103 receive torque to provide traction to the vehicle via wheel hubs 115 and 116. Via mechanisms in the power transfer unit 108, such as a hypoid gear and pinion, the drive shaft 109 receives torque and transmits it to the rear of the vehicle. As shown, an all-wheel drive coupling 120 connects to the drive shaft 109, and a rear drive unit 110 may house the disclosed locking differential assembly 10 within a rear differential assembly. As discussed further herein, the locking differential assembly 10 may be operated in either an open or locked mode. In the open mode, the left rear wheel 113, via wheel hub 117 and left rear axle 111, can spin at a speed that is different from the right wheel 114. Likewise, the right rear wheel 114, via wheel hub 118 and right rear axle 112, can spin at a different speed than left rear wheel 113. In the locked mode, both left and right rear wheels 113 and 114 receive the same torque because the left and right rear axle 111 and 112 are locked together to prevent relative rotation via internal components in the rear differential. An example of a differential mechanism is described in further detail in U.S. Pat. No. 9,657,827 B2, the entire disclosure of which, except for any definitions, disclaimers, disavowals, and inconsistencies, is incorporated herein by reference.

Figure 1:
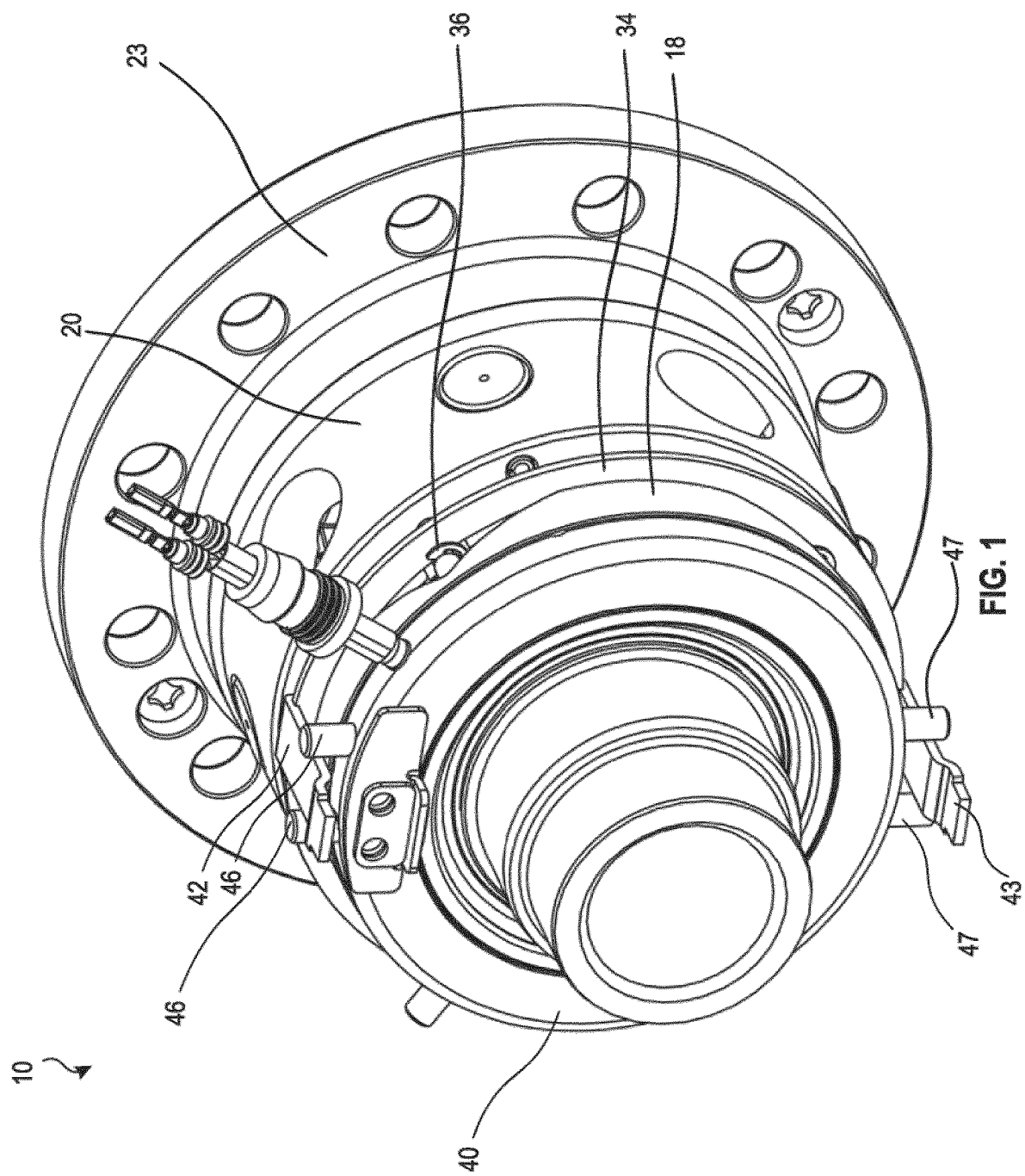
FIG. 1 illustrates a perspective view of an electronic locking differential gear mechanism, constructed in accordance with principles of this disclosure, according to an example.
Figure 2:
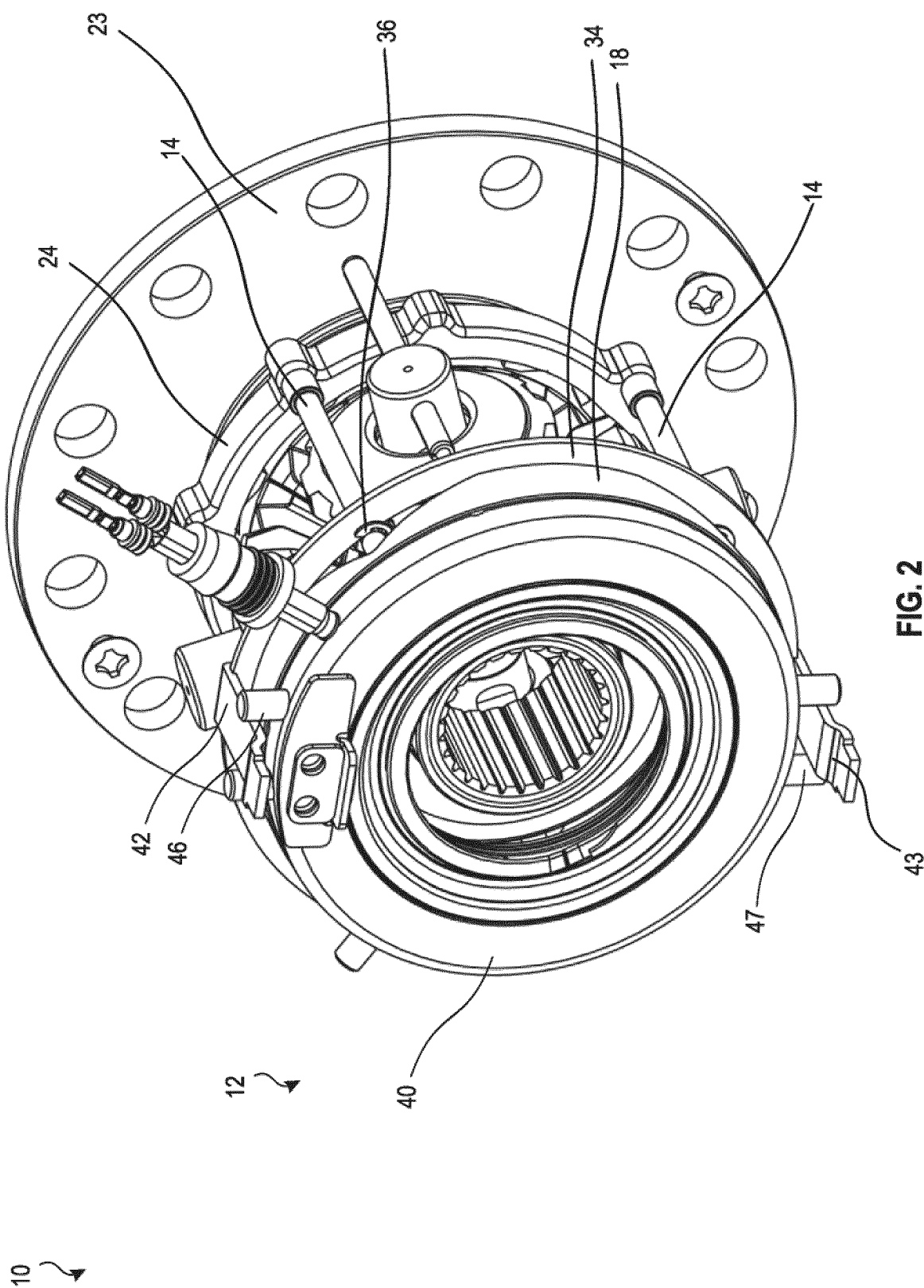
FIG. 2 illustrates a perspective view of the electronic locking differential gear mechanism of FIG. 1, with a housing removed, according to an example.
Figure 3:
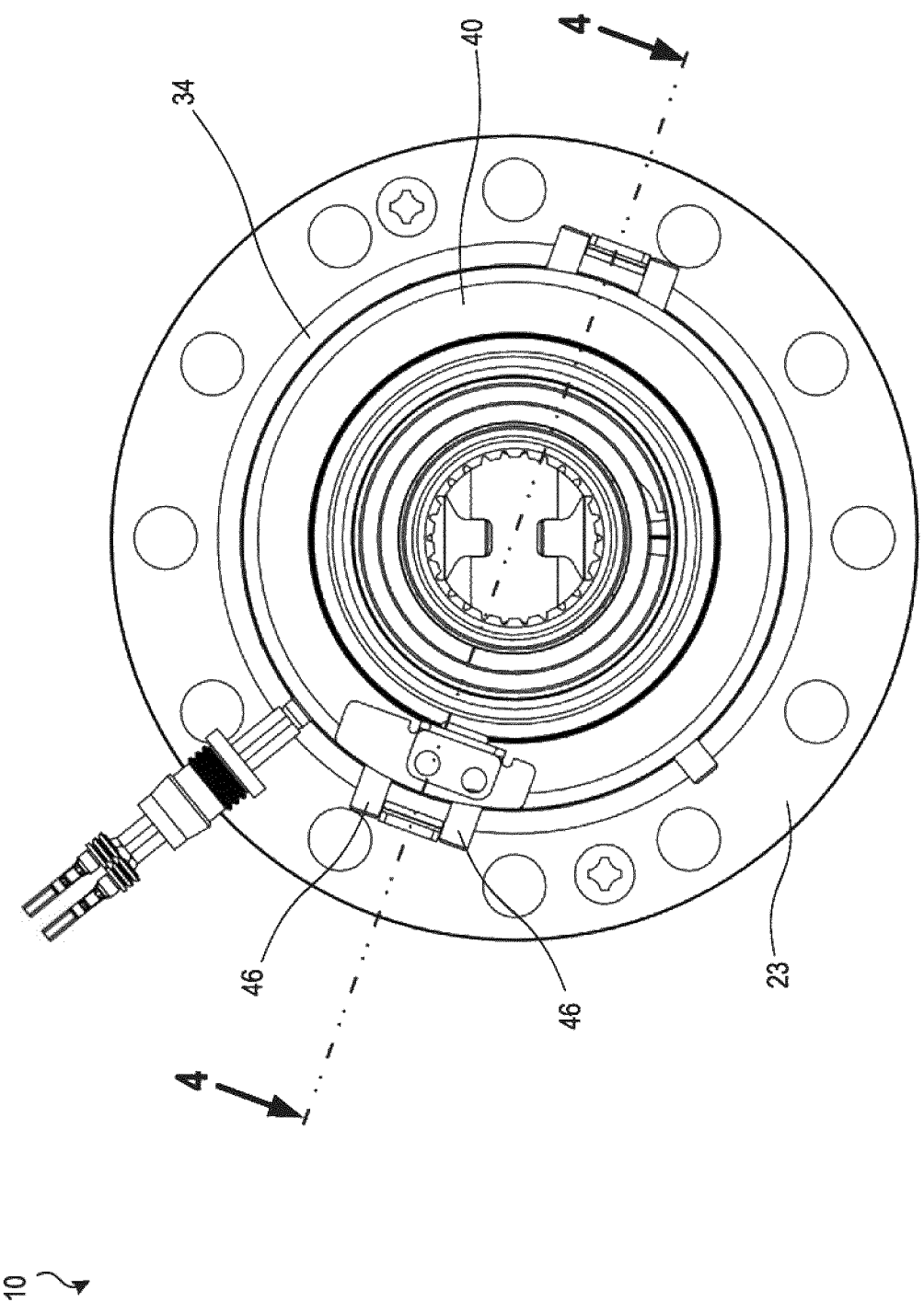
FIG. 3 illustrates a left-side view of the electronic locking differential gear mechanism of FIG. 1, according to an example.
Figure 4:
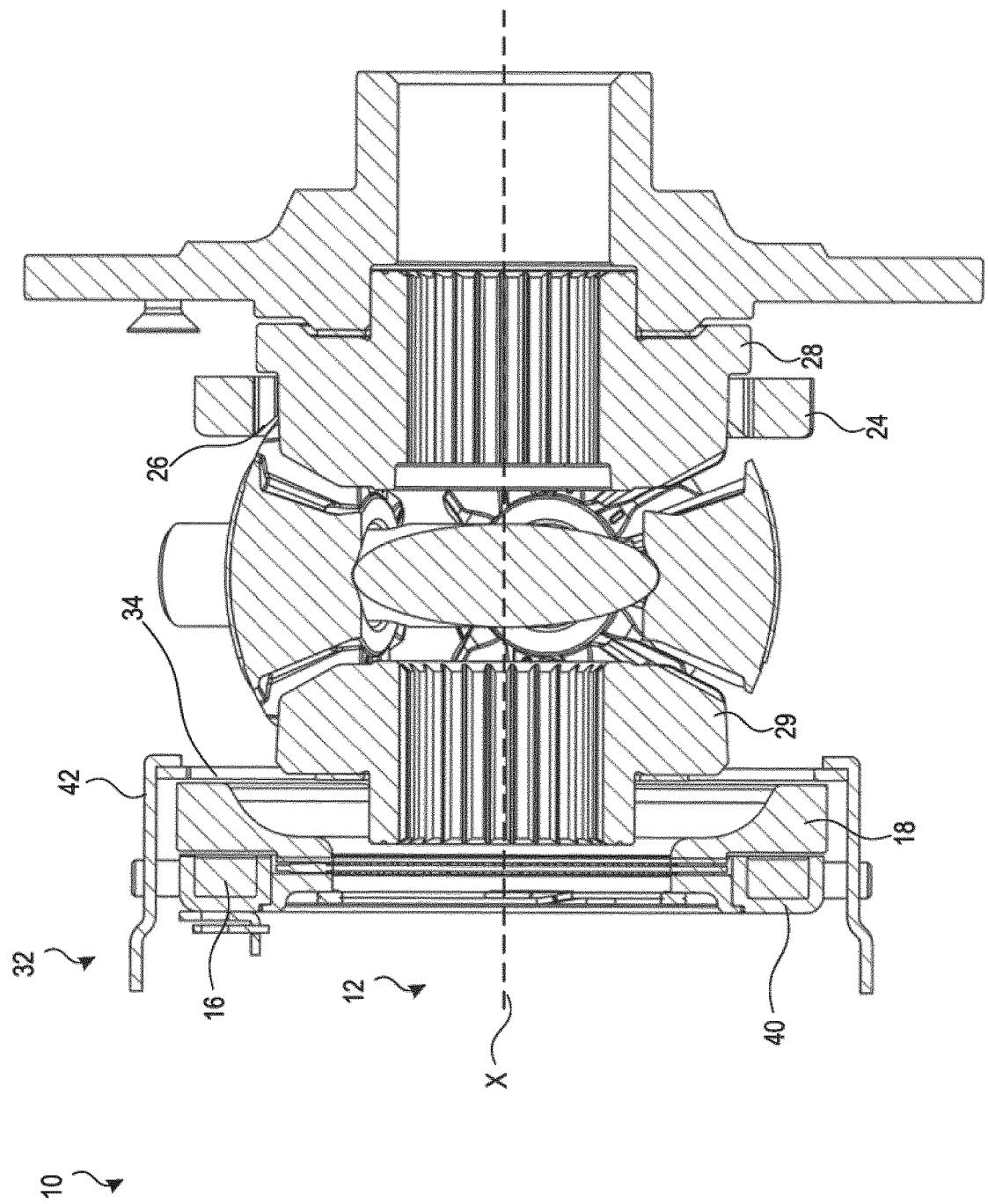
FIG. 4 illustrates a cross-sectional view of the electronic locking differential gear mechanism of FIG. 2, along the plane indicated in FIG. 3, according to an example.

Referring now to the Figures, there is shown an electronic locking differential gear mechanism (e.g., differential assembly) 10 that includes cam/ramp actuated direct acting electronic locking capability. The gear set 50 of the electronic locking differential gear mechanism 10 is located within a case 20 (refer to FIG. 1), and in some examples, torque may be transferred to the gear set 50 via a ring gear mounted to a flange 23. Accordingly, the flange 23 may be referred to as a power input location.

In an aspect, an electric actuator mechanism (e.g., electrically actuated locking assembly or locking element) 12 of the electronic locking differential gear mechanism 10 includes a stator housing 40. The stator housing 40 is mounted to case (e.g., housing) 20. The stator housing 40 is operable between a locked position, in which first and second half-axle outputs are prevented from rotating relative to each other, and an unlocked position, in which the first and second half-axle outputs are enabled to rotate relative to each other. Stator housing 40 includes an electric stator 16, which, in some aspects, causes a ramped collar 18 to be rotationally actuated in relation to the stator housing 40. In an aspect, ramped collar 18 rotates about an axis 2.

Figure 10:
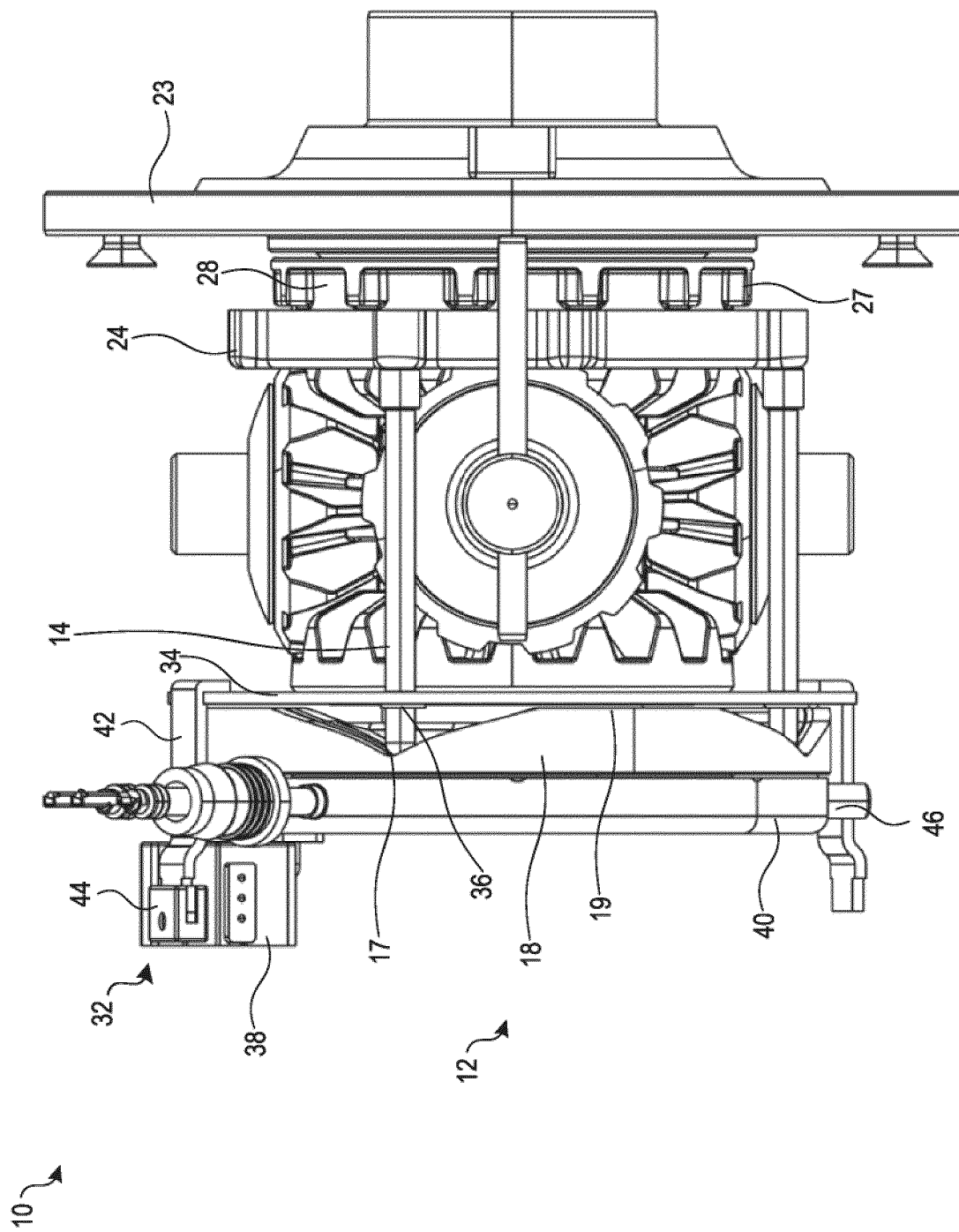
FIG. 10 illustrates a front view of the electronic locking differential gear mechanism of FIG. 2, in an unlocked state, according to an example.
Figure 11:
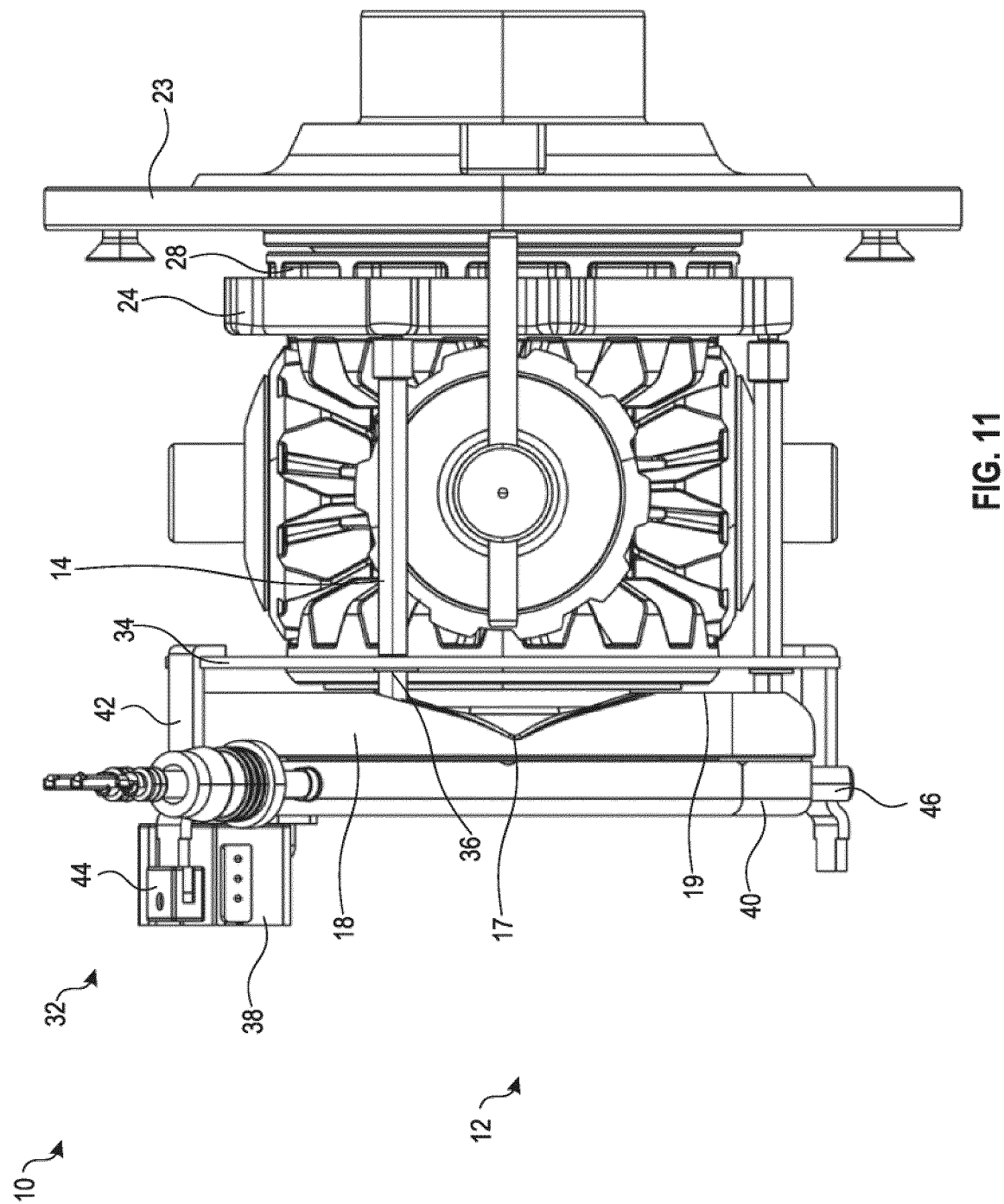
FIG. 11 illustrates a front view of the electronic locking differential gear mechanism of FIG. 2, in a locked state, according to an example.

Referring to FIG. 10-11, in an aspect, ramped collar 18 includes one or more ramps (for example, one or more locations axially where it has a greater or lesser length). Ramped collar 18 includes one or more ramp valleys 17, where the axial length of the ramped collar 18 is the least. Ramped collar 18 includes one or more ramp peaks 19, where the axial length of the ramped collar 18 is the greatest.

Electric actuator mechanism 12 includes at least one actuating push rod 14. Although three push rods 14 are depicted in the example embodiments of the Figures, other embodiments may include more than three push rods 14 or fewer than three push rods 14. Push rods 14 are operably coupled to electric stator 16 via the ramped collar 18. In some aspects, push rods 14 may be generally cylindrical or rod-like in shape. Push rods 14 contact ramped collar 18 at an end of the push rods 14. In some aspects, push rods 14 pass through the case 20 in a bore, and do not rotate with relation to the case 20.

Push rods 14 are coupled to a locking collar 24. In some examples, push rods 14 are coupled to locking collar 24 via press fit design, threaded connection, or any suitable fastening or attachment means.

Push rods 14 are axially displaceable along (parallel to) the axis X of the differential assembly 10. Push rods 14 are axially displaceable by the rotation of the ramped collar 18. Locking collar 24 is axially displaceable by the displaced movement of the push rods 14. By use of the term axial or axially displaceable, it is meant to define a direction that is parallel to the longitudinal axis X of the differential assembly 10. Locking collar 24 includes teeth 26 formed on an inner diameter of the locking collar 24, which selectively engage with external teeth 27 of a locker gear 28. When the teeth 26 of locking collar 24 engage with the external teeth 27 of locker gear 28, the electronic locking differential gear mechanism 10 is placed into a locked position. When the teeth 26 of locking collar 24 are disengaged from the external teeth 27 of locker gear 28, the electronic locking differential gear mechanism 10 is placed into an unlocked position.

The locking collar 24 is disposed within a cavity defined at an outer boundary by the gear case 20 and defined at an inner boundary by the locker gear 28.

In some aspects, the locking collar 24 is biased to a disengaged or unlocked position by a spring or other biasing force member.

In an aspect, each of the push rods 14, in contact with ramped collar 18 at an end, is at an initial position (corresponding to an unlocked state) with its end in contact with a ramp valley 17. As ramp collar 18 is rotated about axis 2, each of the push rods 14 is displaced axially toward locker gear 28, as the end in contact with ramped collar 18 is moved to a maximally displaced position in contact with a ramp peak 19 (corresponding to a locked state). This displaces locking collar 24 toward locker gear 28, allowing teeth 26 and external teeth 27 to engage.

The electronic locking differential gear mechanism 10 includes a sensor assembly 32 to determine the locking state/status (for example, locked or unlocked) of the electronic locking differential gear mechanism 10. The sensor assembly 32 includes at least a sensing plate 34 (e.g., position sensing plate). Sensing plate 34 is axially displaceable along the axis 2. Sensing plate 34 is axially displaceable by at least one of the push rods 14.

Figure 10A:
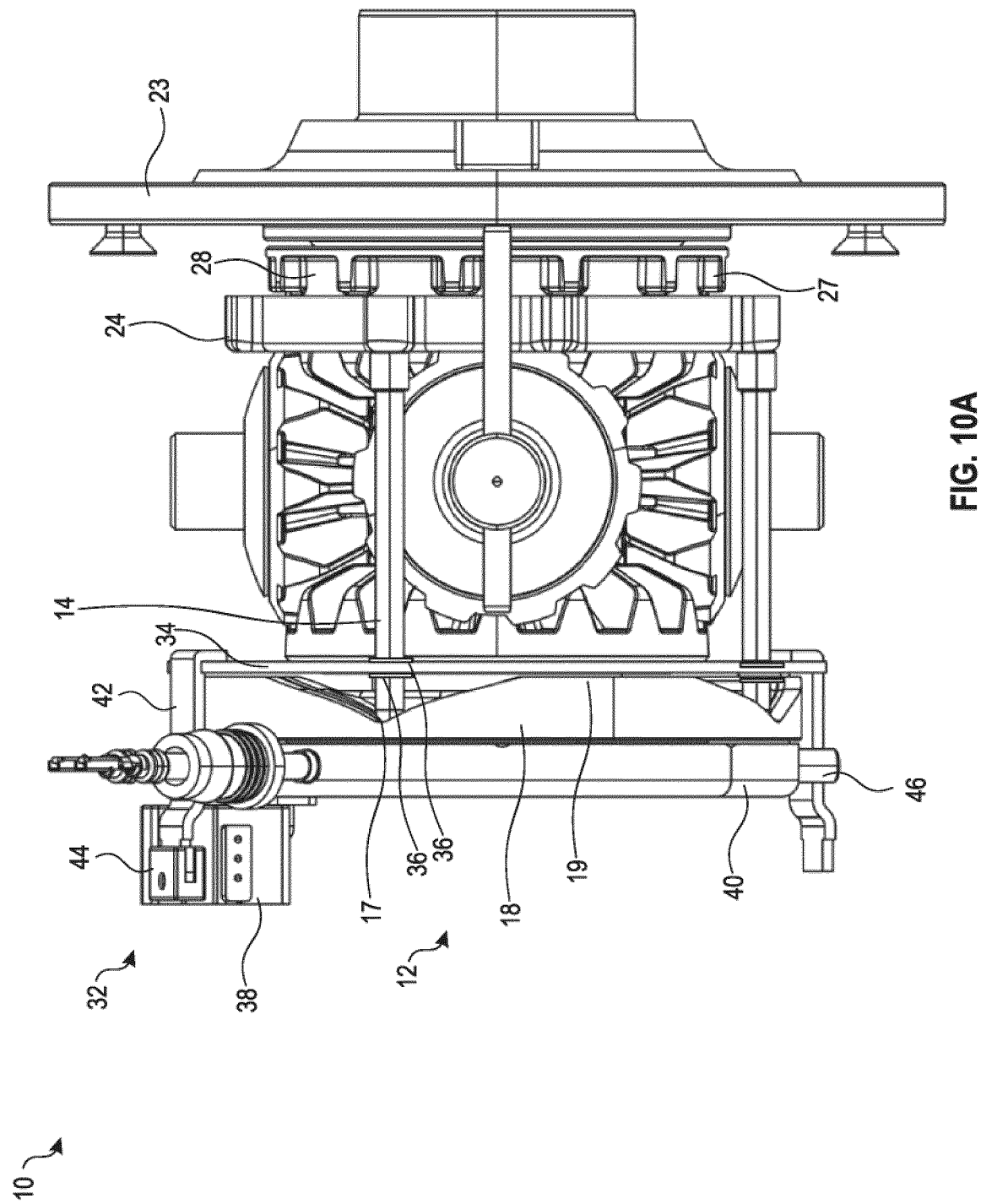
FIG. 10A illustrates a front view of an alternate embodiment of the electronic locking differential gear mechanism of FIG. 10, in an unlocked state, with two snap rings engaged with each push rod, according to an example.

Sensing plate 34 is attached/secured to at least one of the push rods 14. In an aspect, one or more of the push rods 14 includes a groove 15 for receiving an inner edge portion 37 of the sensing plate 34. In an aspect, the sensing plate 34 is attached to a push rod 14 using one or more fasteners. In an aspect, the sensing plate 34 is attached to a push rod 14 using one or more snap rings 36. In an aspect, the sensing plate 34 is attached to a push rod 14 using a step (for example, of a groove 15) on one side of the push rod 14. In an aspect, the sensing plate 34 is attached to a push rod 14 using a step of groove 15 and a snap ring 36 (on a side of the sensing plate 34 opposite the step). In an aspect, the sensing plate 34 is attached to a push rod 14 by sitting within groove 15 and having a snap ring 36 on either side of the sensing plate 34 (refer to FIG. 10A). In an aspect, groove 15 and/or one or more snap rings 36 retain the sensing plate 34 relative to the push rod 14. Other types of fasteners may also be used.

In an aspect, sensing plate 34 includes one or more recesses 33. Recesses 33 are located on the inner edge portion 37 of sensing plate 34. In some aspects, the number of recesses 33 equals the number of push rods 14. In some aspects, recesses 33 are semi-circular (or another segment of a circle) in nature. In some aspects, each of the recesses 33 engage with (for example, receive) at least a portion of an outer surface of one of the push rods 14. In some aspects, each of recesses 33 may engage with one of the push rods 14 at a groove 15. In some aspects, each of recesses 33 facilitate the assembly of sensing plate 34 with push rod 14. Once inserted, sensing plate 34 may be rotated within the groove 15, and then one or more snap rings 36 may be added to the assembly to retain the sensing plate 34.

In an aspect, the inner edge portion 37 of sensing plate 34 defines a central aperture 39 of the sensing plate 34.

Sensing plate 34 is thereby coupled to the electric actuator mechanism (e.g., locking assembly) 12 such that operation of the locking assembly 12 between the locked and unlocked positions causes axial movement of the sensing plate 34.

Sensing plate 34 is coupled to the electric actuator mechanism (e.g., locking assembly) 12 such that sensing plate 34 is non-rotatable with respect to the stator housing.

In an aspect, the ramped collar 18 is located axially between the electric stator 16 and the sensing plate 34.

The sensor assembly 32 includes sensor electronics 38. Sensor electronics 38 include a position sensor configured to measure an axial position of the sensing plate 34 (e.g., detects a displacement of the sensing plate 34). In an example, sensor assembly 32 is attached or mounted to the stator housing 40 by any appropriate means of attachment. Various sensor types may be utilized including, magnetic-type sensors such as Hall-effect sensors. In an aspect, the sensor is spaced from the sensor tab 42, discussed below, of the sensing plate 34 such that the sensor does not physically contact the axially displaceable sensor tab 42. Accordingly, the sensor assembly 32 may be referred to as a non-contacting sensor assembly. In an embodiment, a linear variable differential transformer (LVDT) sensor may be utilized.

In an aspect, the sensor assembly 32 includes a sensor tab (or sensor bracket) 42. Sensor tab 42 is displaceable by the sensing plate 34 along axis X. Sensor tab 42 extends axially from the sensing plate 34 in a direction away from the locker gear 28. In an aspect, sensor tab 42 has a substantially L-shaped cross section, with the shorter base length of the L-shape contacting a surface of the sensing plate 34 opposite of the sensor electronics. In an aspect, sensor tab 42 is attached to the sensing plate 34. Sensor tab 42 may be attached to, mounted on, or fastened to sensing plate 34 by any means, including by welding, the use of adhesives, or the use of fasteners. In another aspect, sensor tab 42 and sensing plate 34 may be integrally formed as a single component. In an aspect, sensing plate 34 includes a notch 35. In some embodiments, at least a portion of tab 42 may engage with (for example, sit in or fit in) notch 35.

In an aspect, sensor tab 42 includes a sensor target 44 attached to or mounted thereon. The sensor tab 42 is positioned adjacent to the sensor electronics 38 to determine axial movement of the sensor plate 34. In an aspect, a position of the sensor target 44 is detectable by the sensor assembly. In an aspect, the sensor target 44 is a magnet and the sensor electronics 38 are configured to detect a magnetic field of the sensor target 44.

In an aspect, stator housing 40 includes anti-rotation lugs or tabs 46, 47 formed or attached thereon. The sensor tab 42 is positioned between the anti-rotation lugs or tabs 46, thereby preventing rotation of the sensing plate 34 relative to the stator housing 40. To further provide anti-rotation capability, an additional extension or tab structure 43 is shown as being part of or secured to the sensing plate 34 and located oppositely from the sensor tab 42. The tab structure 43 interacts with lugs 47 to prevent rotation of the sensing plate 34. By providing two such structures, the anti-rotation forces at tabs 42, 43 are balanced such that an undesirable torque exerted on the sensing plate 34 by the lugs is reduced or eliminated. As with sensor tab 42 and sensing plate 34, the tab structure 43 may also be attached to, mounted on, or fastened to sensing plate 34 by any means, including by welding, the use of adhesives, or the use of fasteners, or may be integrally formed as a single component with the sensing plate.

Figure 13:
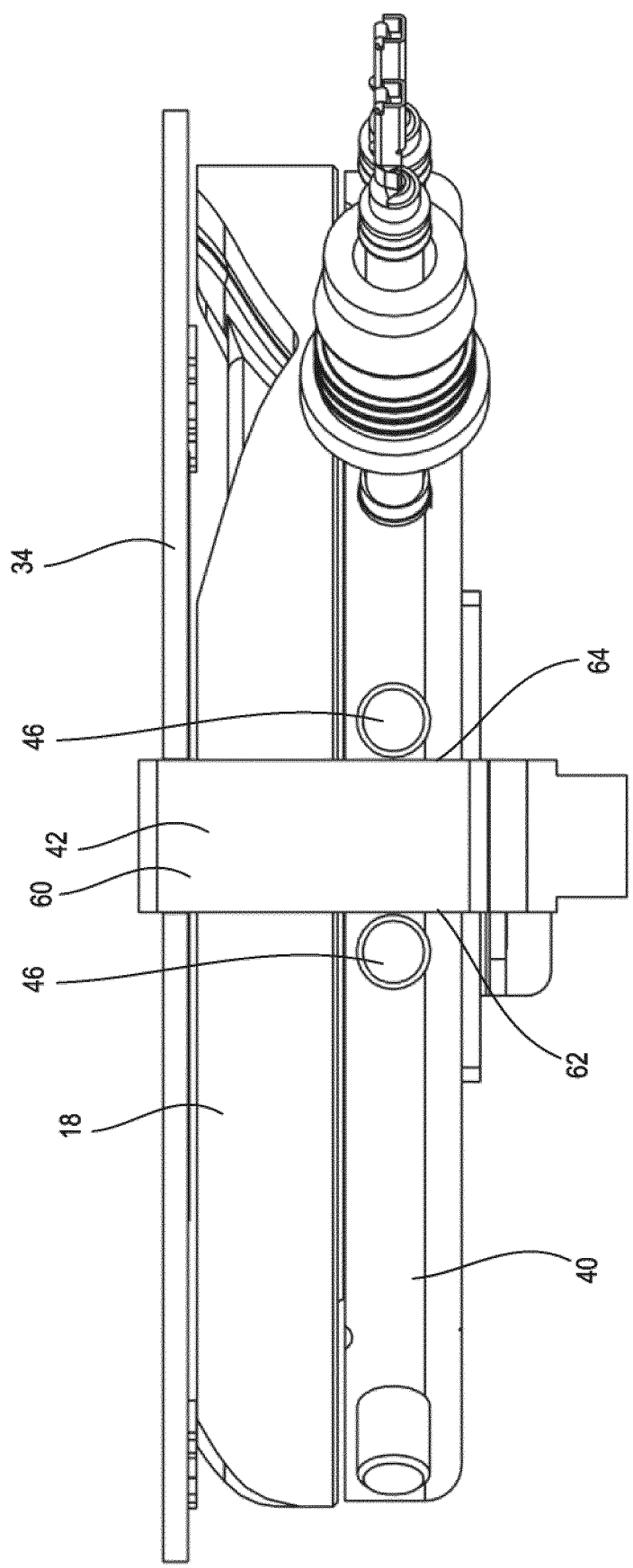
FIG. 13 illustrates a top view of a portion of the electronic locking differential gear mechanism of FIG. 1, including the sensing plate and anti-rotation lugs, according to an example.
Figure 14:
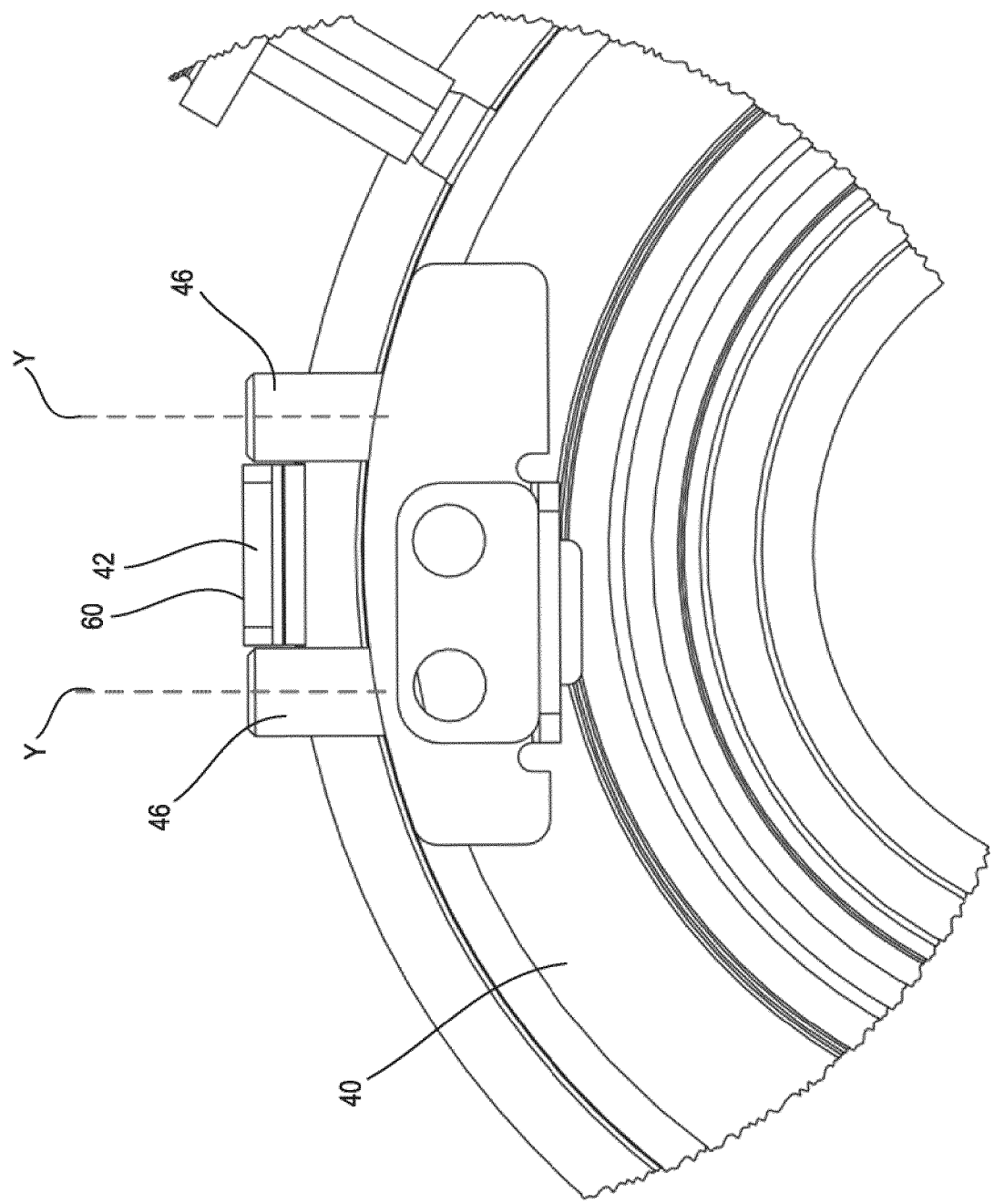
FIG. 14 illustrates a close-up front view of a portion of the sensor assembly of FIG. 7, including the sensing plate and anti-rotation lugs, according to an example.

In an aspect, anti-rotation lugs 46 (and, in some examples, lugs 47) are oriented parallel to each other and perpendicular to upper surface 60 of the sensor tab 42. Refer to FIGS. 13 and 14. A center point of each of the anti-rotation tabs 46 defines an axis Y. Each of the vertical axes Y are parallel to each other and orthogonal to the axis X. Each of the axes Y are at an oblique angle to a radial line extending from axis X.

As discussed above, sensor tab 42 is positioned between the anti-rotation lugs 46, thereby preventing rotation of the sensing plate 34 relative to the stator housing 40 during movement of the sensing plate 34. In the depicted embodiment, the anti-rotation lugs 46 define parallel vertical surfaces that face and are parallel to side surfaces 62, 64 of sensor tab 42 (for example, when the sensing plate 34 is centered between the pair of anti-rotation lugs 46) such that, when an anti-rotation lug 46 contacts a side surface 62 or 64, contact is maximized between the vertical surface of the anti-rotation lug 46 and the side surface 62 or 64. In this way, the anti-rotation lugs 46 co-operate to mitigate lash experienced by the sensor tab 42 during movement of the sensing plate 34. The mitigation of lash may result in improved position of the sensing plate 34 and a more accurate sensor assembly 32.

In an example, where axis X is oriented substantially horizontal, the anti-rotation lugs 46 may be oriented in a substantially vertical position (with axes Y substantially vertical).

The anti-rotation lugs 46 may be fastened, adhered, welded, or integrated into (e.g., via casting, molding, machining) the stator housing 40. In some examples, the anti-rotation lugs 46 (and lugs 47) may be of cylindrical, rectangular prism, or other suitable shape.

In some examples, the diameter of each anti-rotation lug 46 may be about 6.0 mm, with tolerances of about +/−0.2 mm. In some examples, the diameter of each anti-rotation lug 46 may be from about 4.0 mm to about 8.0 mm. In some examples, the diameter of each anti-rotation lug 46 may be from about 5.0 mm to about 7.0 mm. In some examples, the diameter of each anti-rotation lug 46 may be from about 5.5 mm to about 6.5 mm.

In some examples, the width of sensor tab 42 (as measured between the side surfaces 62 and 64 where they face (and potentially contact) the anti-rotation lugs 46) may be about 12.3 mm, with tolerances of about +/−0.1 mm. In some examples, the width of sensor tab 42 may be from about 10.0 mm to about 14.0 mm. In some examples, the width of sensor tab 42 may be from about 11.0 mm to about 13.0 mm. In some examples, the width of sensor tab 42 may be from about 12.0 mm to about 12.6 mm.

Figure 15:
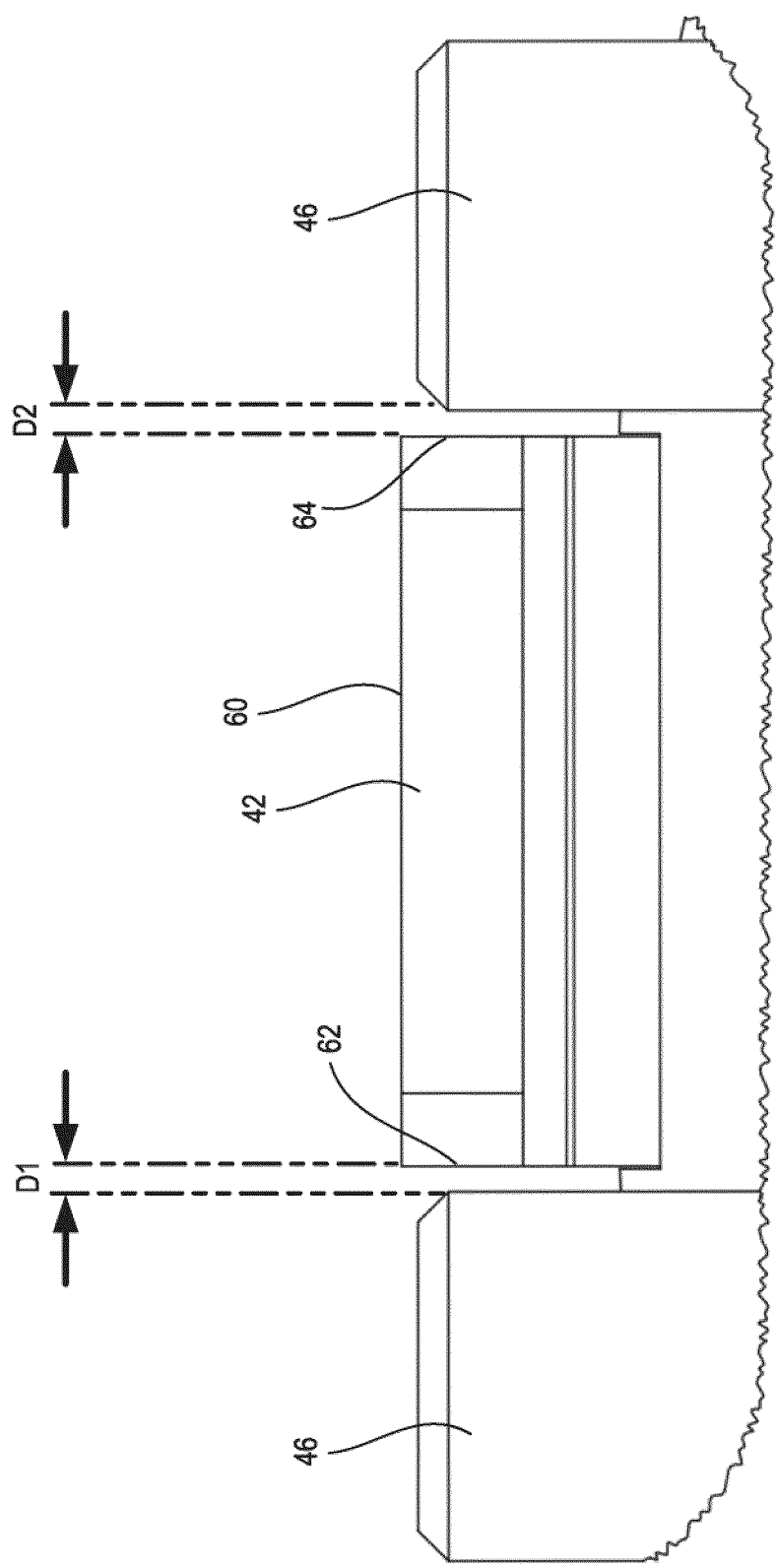
FIG. 15 illustrates a close-up front view of the sensing plate and anti-rotation lugs, illustrating an example embodiment with a distance between each side of the sensing plate and the anti-rotation lug it faces, according to an example.

In an aspect, the vertical surfaces of one or both of the anti-rotation lugs 46 contact the side surfaces 62, 64. In an example, a gap distance exists between one or both of the anti-rotation lugs 46 and the side surfaces 62, 64. Refer to FIG. 15. A gap distance D1 may exist between one of the anti-rotation lugs 46 and side surface 62. A gap distance D2 may exist between one of the anti-rotation lugs 46 and side surface 64. In some examples, gap distances D1 and D2 are equal. In some examples, gap distances D1 and D2 are unequal.

In some examples, the width of each of gap distances D1 and D2 vary over time as the electronic locking differential gear mechanism 10 operates. If the width of gap distance D1 or D2 varies to 0 mm, then there is contact between the vertical surface of the respective the anti-rotation lug 46 the respective side surface 62 or 64. This contact prevents rotation of the sensing plate 34 relative to the stator housing 40.

In some examples, the total lash or total play (the sum of the gap distances D1 and D2) may be about 0.3 mm. In some examples, the total lash may be between about 0.2 mm to about 0.4 mm. In some examples, the total lash may be between about 0.15 mm to about 0.5 mm.

In some examples, anti-rotation lug 46 may have analogous dimensions and orientations to anti-rotation lugs 46. In some examples, tab structure 43 may have analogous dimensions and orientations to sensor tab 42.

In an example use, the electric actuator mechanism 12 is in a normal, unlocked status. Refer to FIG. 10. For example, it may be biased to an unlocked state by a spring or biasing element. In the unlocked state, locking collar 24 is moved axially away from engagement with locker gear 28.

Figure 5:
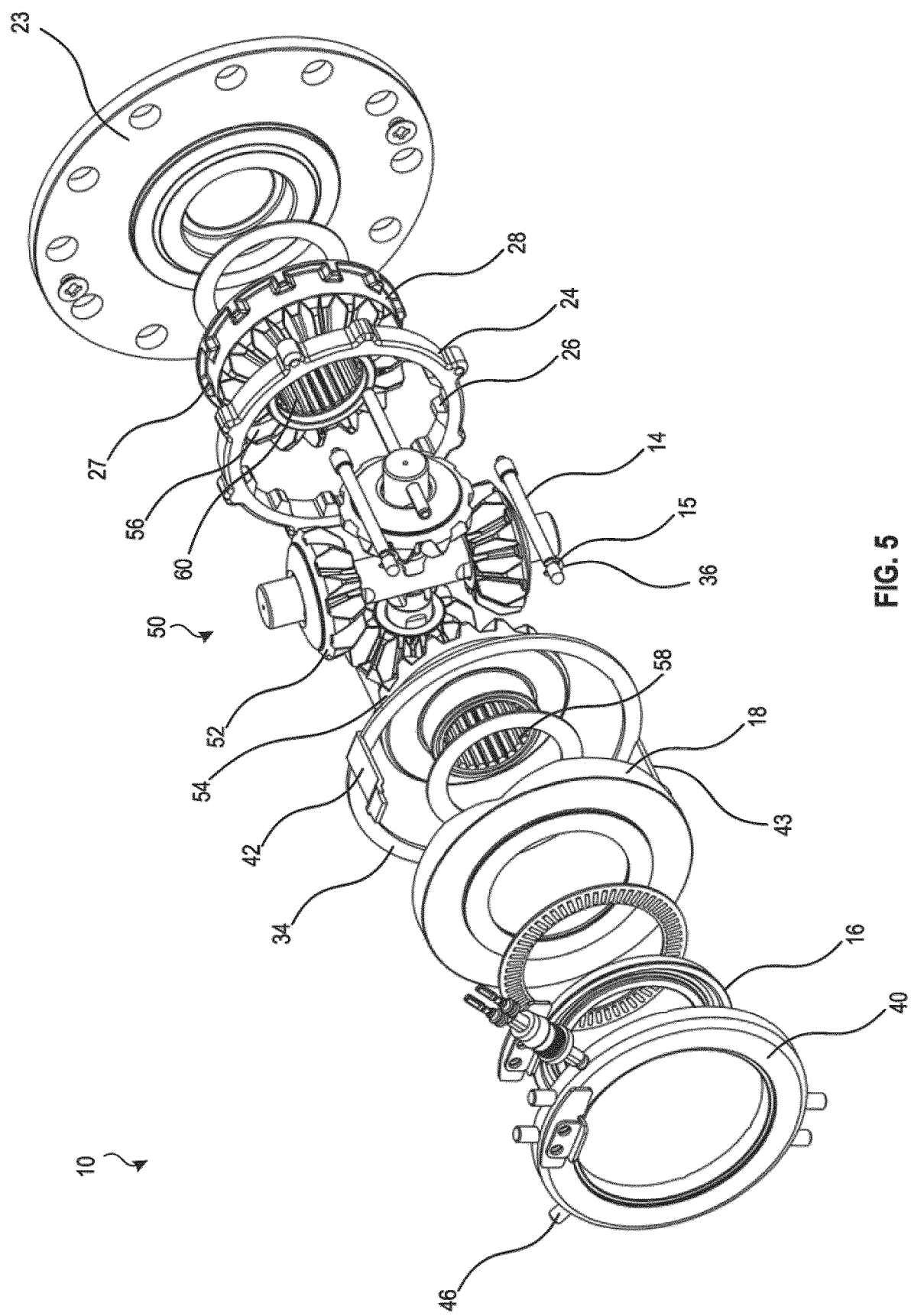
FIG. 5 illustrates a front-perspective exploded view of the electronic locking differential gear mechanism of FIG. 2, according to an example.
Figure 6:
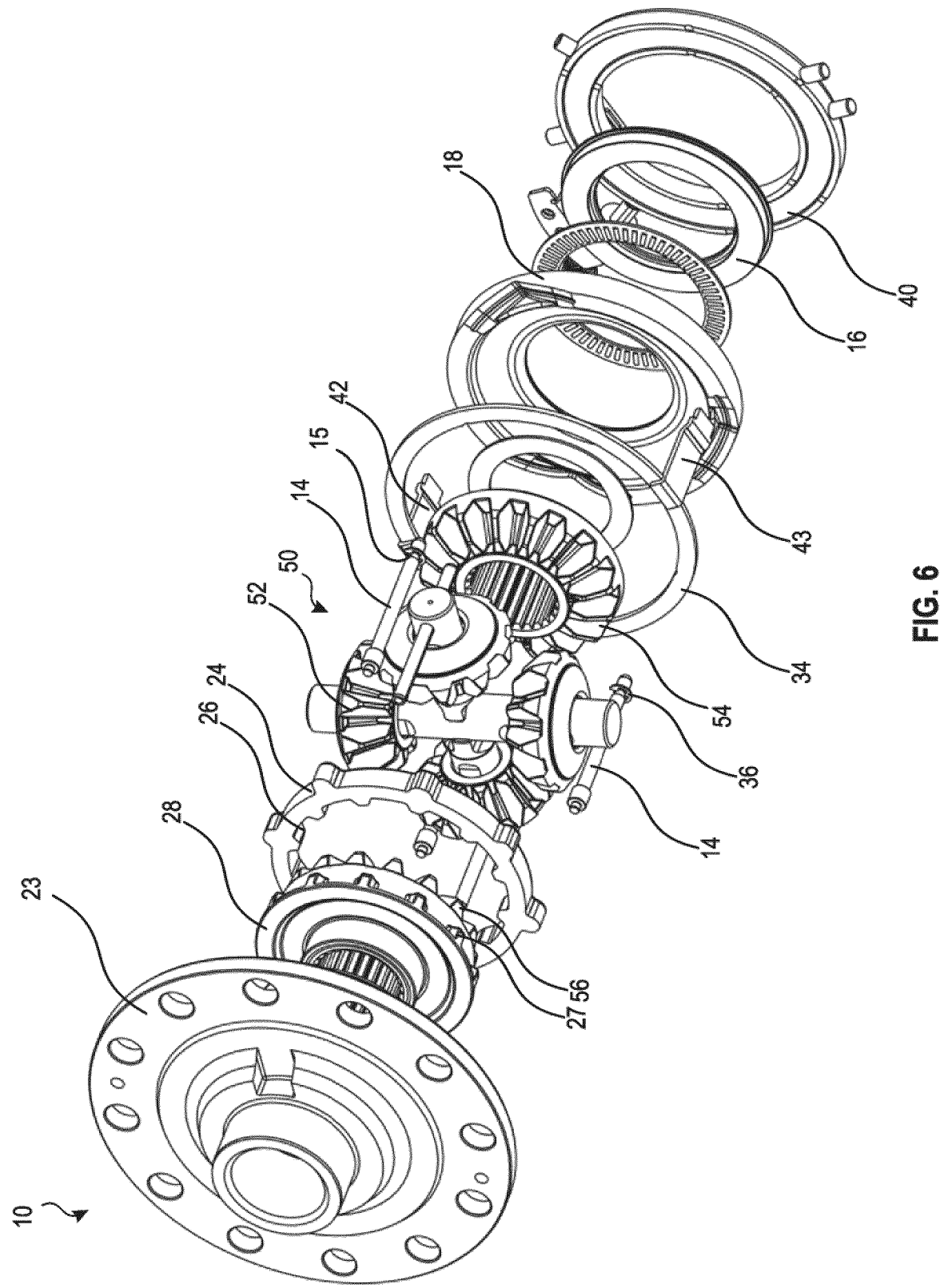
FIG. 6 illustrates a rear-perspective exploded view of the electronic locking differential gear mechanism of FIG. 2, according to an example.
Figure 7:
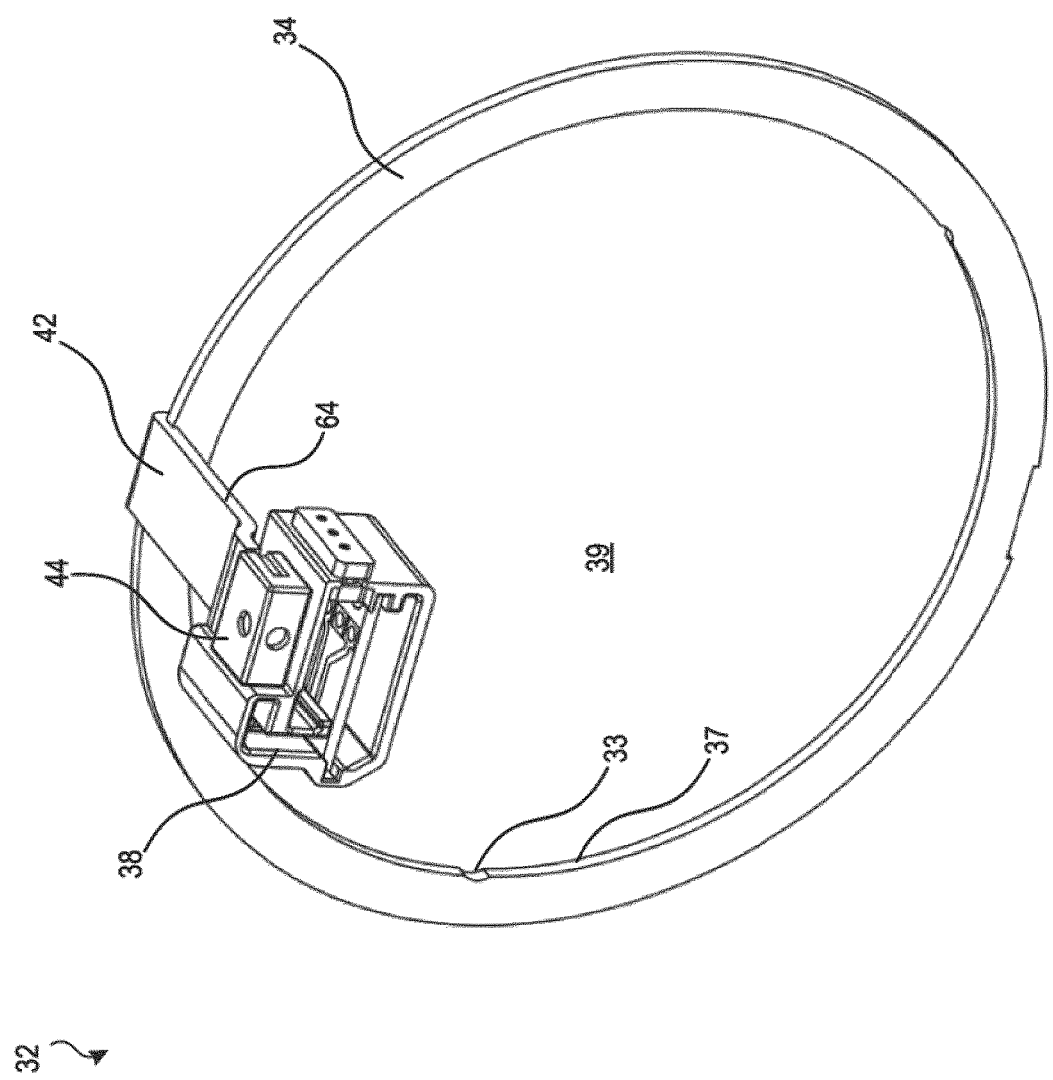
FIG. 7 illustrates a perspective view of a sensor assembly for an electronic locking differential gear mechanism, constructed in accordance with principles of this disclosure, according to an example.
Figure 8:
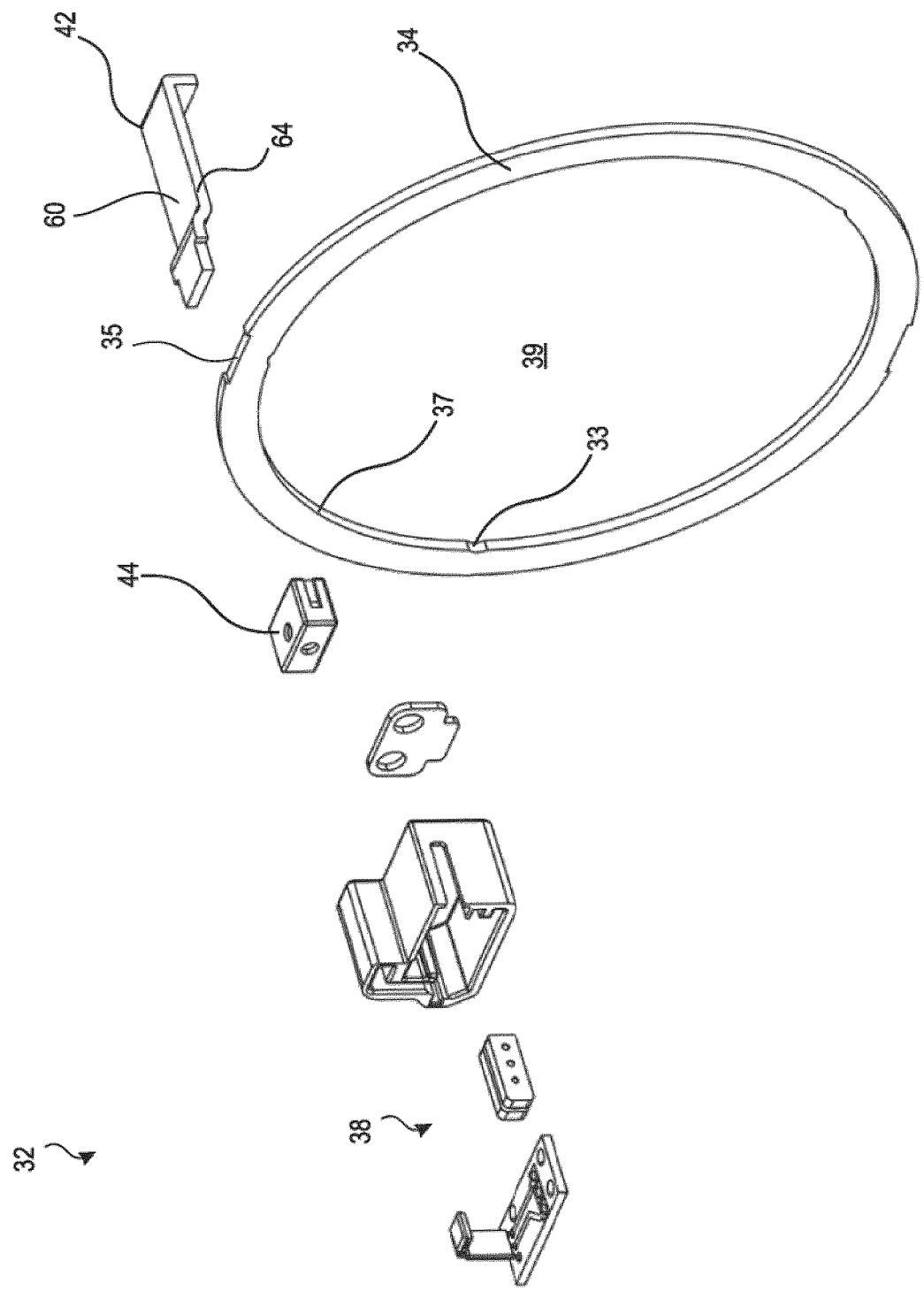
FIG. 8 illustrates an exploded view of the sensor assembly of FIG. 7, according to an example.
Figure 9:
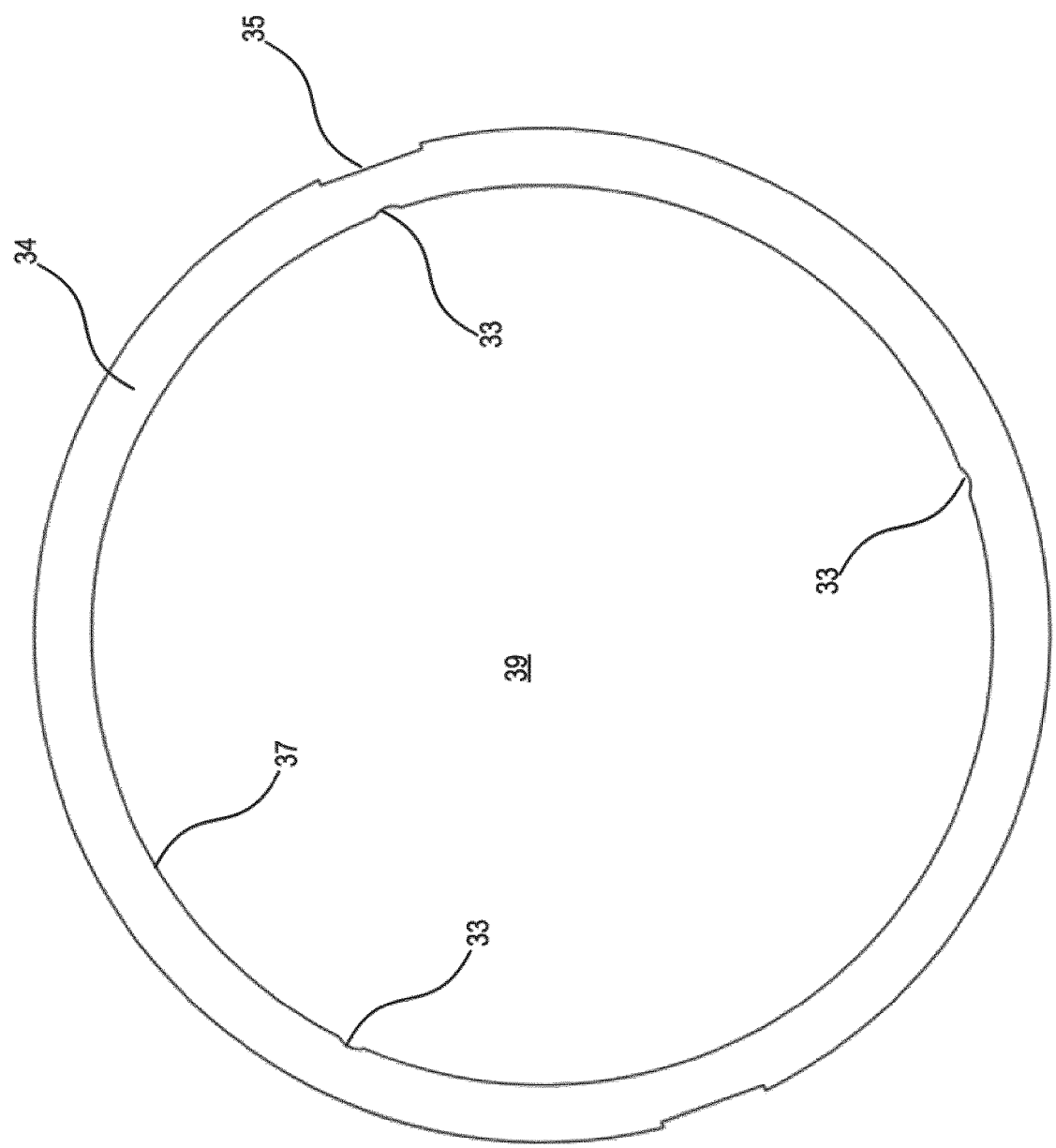
FIG. 9 illustrates a side view of a sensing plate for the sensor assembly of FIG. 7, according to an example.

Upon activation/energizing (which may be in response to a control signal from a control module or may be actuated in response to activation of a switch by a user) of the electric stator 16, the ramped collar 18 is rotated about axis 2, and at least one push rod 14 is displaced axially. As shown at FIGS. 5 and 6, a bearing assembly 17 can be provided between the stator 16 and collar 18 to facilitate relative movement between the two components. Locking collar 24 is moved by the displacement of the one or more push rods 14 to engage with the locker gear 28, which causes the locking of the electronic locking differential gear mechanism 10. Refer to FIG. 11.

Sensing plate 34 is displaced axially with the push rods 14 and correspondingly the sensor tab 42 with the sensor target 44 is displaced relative to the sensor electronics 38. The position sensor senses/detects the axial displacement of the sensor target 44 (and therefore the displacement of the sensing plate 34).

A signal is thereby produced that indicates that the electronic locking differential gear mechanism 10 is in a locked condition. The status can then be indicated to a user of the vehicle, in some aspects.

In some aspects, after the electric stator 16 is de-energized, the electronic locking differential gear mechanism 10 is returned to an unlocked position (for example, by a biasing element or spring). The sensing plate 34 moves with the push rods 14 (and correspondingly the sensor tab 42 with the sensor target 44 moves relative to the sensor electronics 38). A signal is thereby produced that indicates that the differential 10 is in an un-locked condition. The status can then be indicated to a user of the vehicle, in some aspects.

For the purposes of this application, terms such as "left," "right," "front," "back," "upper," "lower," "upward," and "downward" are intended to be descriptive with reference to and in relation to the orientation shown in the Figures for clarity and are not meant to be limiting, but the examples as practiced and included in the scope of the claims may include examples where the systems and devices are in a different orientation.

While particular uses of the technology have been illustrated and discussed above, the disclosed technology can be used with a variety of environments in accordance with many examples of the technology. The above discussion is not meant to suggest that the disclosed technology is only suitable for implementation within the environments shown and described above. For examples, while certain technologies described herein were primarily described in the context of sealed battery cases, technologies disclosed herein are applicable to sealed components generally.

This disclosure described some aspects of the present technology with reference to the accompanying drawings, in which only some of the possible aspects were shown. Other aspects can, however, be embodied in many different forms and should not be construed as limited to the aspects set forth herein. Rather, these aspects were provided so that this disclosure was thorough and complete and fully conveyed the scope of the possible aspects to those skilled in the art.

As should be appreciated, the various aspects described with respect to the Figures herein are not intended to limit the technology to the particular aspects described. Accordingly, additional configurations can be used to practice the technology herein and/or some aspects described can be excluded without departing from the methods and systems disclosed herein.

Similarly, where operations of a process are disclosed, those operations are described for purposes of illustrating the present technology and are not intended to limit the disclosure to a particular sequence of operations. For example, the operations can be performed in differing order, two or more operations can be performed concurrently, additional operations can be performed, and disclosed operations can be excluded without departing from the present disclosure. Further, each operation can be accomplished via one or more sub-operations. The disclosed processes can be repeated.

Although specific aspects were described herein, the scope of the technology is not limited to those specific aspects. One skilled in the art will recognize other aspects or improvements that are within the scope of the present technology. Therefore, the specific structure, acts, or operations are disclosed only as illustrative aspects. The scope of the technology is defined by the following claims and any equivalents therein.

What is claimed is:

1. A differential assembly comprising:
a) a first housing;
b) a first half-axle output;
c) a second half-axle output;
d) a power input location;
e) a gear set disposed within the first housing and operably connecting the first half-axle output, the second half-axle output, and the power input location together;
f) an electrically activated locking assembly including a second housing mounted to the first housing and being operable between a locked position, in which the first and second half-axle outputs are prevented from rotating relative to each other, and an unlocked position, in which the first and second half-axle outputs are enabled to rotate relative to each other, the locking assembly including a first pair of anti-rotation members extending from the second housing;
g) a sensor assembly including a position sensing plate defining a first axially extending tab supporting a sensor target of a position sensor, the position sensing plate being coupled to the locking assembly such that operation of the locking assembly between the locked and unlocked positions causes axial movement of the position sensing plate, the first axially extending tab being located between the first pair of anti-rotation members such that the position sensing plate is non-rotatable with respect to the second housing, the position sensor being configured to measure an axial position of the position sensing plate.

2. The differential assembly of claim 1, wherein the position sensor is configured to sense movement of the axially extending tab.

3. The differential assembly of claim 2, wherein the position sensor is a magnetic-type position sensor that is spaced from the position sensing plate.

4. The differential assembly of claim 1, wherein the first pair of anti-rotation members includes first and second members that are parallel to each other.

5. The differential assembly of claim 1, wherein the first pair of anti-rotation members includes first cylindrical lug and second cylindrical lug.

6. The differential assembly of claim 1, further comprising:
a second pair of anti-rotation members located oppositely from the first pair of anti-rotation members; and
a second axially extending tab located oppositely from the first axially extending tab and extending between the second pair of anti-rotation members.

7. A lock detection mechanism for a differential assembly, the lock detection mechanism comprising:
a locking element of the differential assembly, operable between a locked state and an unlocked state;
one or more push rods displaceable in a direction parallel to an axis of the differential assembly, connected at a first end to a locking collar of the locking element and in contact at a second end with a ramped collar, wherein:
the ramped collar is rotatable about the axis,
the ramped collar comprises one or more ramp valleys and one or more ramp peaks, and
the one or more push rods are displaceable by the one or more ramp valleys and one or more ramp peaks;
a position sensing plate axially displaceable along the axis, wherein the position sensing plate is displaceable by the one or more push rods; and
a sensor assembly including a sensor to detect a status of the locking element, wherein the sensor assembly detects a displacement of a sensor target supported by an axially extending tab of the position sensing plate, the axially extending tab being located between a first pair of anti-rotation members to prevent rotation of the position sensing plate about the axis.

8. The lock detection mechanism of claim 7, wherein the axially extending tab is connected to the position sensing plate at a first end,
wherein the axially extending tab is displaceable by the position sensing plate along the axis,
wherein the axially extending tab is connected to the sensor target at a second end, and
wherein a position of the sensor target is detectable by the sensor.

9. The lock detection mechanism of claim 8, wherein the sensor is a magnetic-type position sensor that is spaced from the position sensing plate.

10. The lock detection mechanism of claim 8, wherein the position sensing plate comprises a notch, and wherein at least a portion of the tab fits within the notch.

11. The lock detection mechanism of claim 8, wherein the first pair of anti-rotation members includes first and second members that are parallel with each other.

12. The lock detection mechanism of claim 7, wherein the position sensing plate comprises one or more recessed portions, each of the one or more recessed portions receiving a portion of one of the one or more push rods.

13. The lock detection mechanism of claim 12, wherein each of the one or more push rods includes a groove receiving the respective recessed portion of the position sensing plate and at least one snap-ring on at least one side of the position sensing plate.

14. The lock detection mechanism of claim 7, wherein the ramped collar is rotatable by an electronic actuator mechanism.

15. A differential assembly comprising:
a differential including a gear set disposed within a housing and operably coupling a power input location to a first half-axle output and a second half-axle output;
an electrically activated locking assembly operable between a locked position, in which the first and second half-axle outputs are prevented from rotating relative to each other, and an unlocked position, in which the first and second half-axle outputs are enabled to rotate relative to each other; and the lock detection mechanism of claim 7 for sensing and indication of a locked and unlocked state of the locking element.

16. The differential assembly of claim 7, wherein the first pair of anti-rotation members includes first cylindrical lug and second cylindrical lug.

17. A lock detection arrangement for a differential assembly, the lock detection arrangement comprising:
- a sensor assembly including a position sensing plate and a position sensor, the position sensing plate being configured for connection to a locking element of the differential assembly and axially displaceable with reference to the position sensor between a locked state of the locking element and an unlocked state of the locking element; and
- a pair of parallel anti-rotation lugs between which a first tab structure of the position sensing plate extends, the pair of parallel anti-rotation lugs preventing rotation of the position sensing plate.

18. The lock detection arrangement of claim 17, wherein each of the pair of parallel anti-rotation lugs has a cylindrical shape, and wherein side surfaces of the first tab structure are parallel to the pair of parallel anti-rotation lugs when the position sensing plate is centered between the pair of parallel anti-rotation lugs.

19. The lock detection arrangement of claim 17, further comprising:
- a second pair of anti-rotation lugs opposite the first pair of anti-rotation lugs; and
- a second tab structure opposite the first tab structure and extending between the second pair of anti-rotation lugs.

20. The differential assembly of claim 17, wherein side surfaces of the first tab structure are parallel to the pair of anti-rotation lugs when the position sensing plate is centered between the pair of anti-rotation lugs.

21. The lock detection arrangement of claim 17, the first tab structure supports a sensor target of the sensor assembly.

* * * * *